(12) United States Patent
Collobert et al.

(10) Patent No.: US 8,180,633 B2
(45) Date of Patent: May 15, 2012

(54) FAST SEMANTIC EXTRACTION USING A NEURAL NETWORK ARCHITECTURE

(75) Inventors: Ronan Collobert, Princeton, NJ (US); Jason Weston, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 1007 days.

(21) Appl. No.: 12/039,965

(22) Filed: Feb. 29, 2008

(65) Prior Publication Data

US 2008/0221878 A1    Sep. 11, 2008

Related U.S. Application Data

(60) Provisional application No. 60/893,712, filed on Mar. 8, 2007.

(51) Int. Cl.
*G10L 15/16* (2006.01)
(52) U.S. Cl. .............. 704/232; 704/9; 706/20
(58) Field of Classification Search .......... 704/232, 704/9; 706/20
See application file for complete search history.

(56) References Cited

U.S. PATENT DOCUMENTS

| 6,189,002 B1 | 2/2001 | Roitblat |
| 6,246,977 B1 * | 6/2001 | Messerly et al. ............ 704/9 |
| 6,598,047 B1 | 7/2003 | Russell et al. |

OTHER PUBLICATIONS

LeCun, Y., et al. "Efficient BackProp" 1998, Springer, in "Neural Networks: Tricks of the Trade". pp. 9-50.*
E. Brill; A Simple Rule-Based Part of Speech Tagger; Proc. of the Third Conf on Appllied Natural Language Processing; 1992; pp. 152-156.
Pradhan et al., Shallow Semantic Parsing using Support Vector Machines; Proc. of HLT/NAACL; 2004; 8 pages.

* cited by examiner

*Primary Examiner* — Vincent P Harper
(74) *Attorney, Agent, or Firm* — James Bitetto; Joseph Kolodka (57) ABSTRACT

A system and method for semantic extraction using a neural network architecture includes indexing each word in an input sentence into a dictionary and using these indices to map each word to a d-dimensional vector (the features of which are learned). Together with this, position information for a word of interest (the word to labeled) and a verb of interest (the verb that the semantic role is being predicted for) with respect to a given word are also used. These positions are integrated by employing a linear layer that is adapted to the input sentence. Several linear transformations and squashing functions are then applied to output class probabilities for semantic role labels. All the weights for the whole architecture are trained by backpropagation.

21 Claims, 3 Drawing Sheets

FIG. 1

Example 1:

TRUTH: He camped out at a high-tech nerve center on the floor of [the Big Board, where] $_{ARGM-LOC}$ [he] $_{ARG0}$ [could] $_{ARGM-MOD}$ [watch] $_{REL}$ [updates on prices and pending stock orders] $_{ARG1}$.

ASSERT (68.7%): He camped out at a high-tech nerve center on the floor of the Big Board, [where] $_{ARGM-LOC}$ [he] $_{ARG0}$ [could] $_{ARGM\_MOD}$ [could] $_{ARGM-MOD}$ [watch] $_{REL}$ [updates] $_{ARG1}$ on prices and pending stock orders.

NN (100%): He camped out at a high-tech nerve center on the floor of [the Big Board, where] $_{ARGM\_LOC}$ [he] $_{ARG0}$ [could] $_{ARGM-MOD}$ [watch] $_{REL}$ [updates on prices and pending stock orders] $_{ARG1}$.

Example 2:

TRUTH: [United Auto Workers Local 1069, which] $_{ARG0}$ [represents] $_{REL}$ [3,000 workers at Boeing's helicopter unit in Delaware County, Pa.] $_{ARG1}$, said it agreed to extend its contract on a day-by-day basis, with a 10-day notification to cancel, while it continues bargaining.

ASSERT (100%): [United Auto Workders Local 1069, which] $_{ARG0}$ [represents] $_{REL}$ [3,000 workers at Boeing's helicopter unit in Delaware County, Pa.] $_{ARG1}$, said it agreed to extend its contacts on a day-by-day basis, with a 10-day notification to cancel, while it continues bargaining.

NN (89.1%): [United Auto Workers Local 1069, which] $_{ARG0}$ [represents] $_{REL}$ [3,000 workers at Boeing's helicopter unit] $_{ARG1}$ [ in Delaware County] $_{ARGM-LOC}$, Pa., said it agreed to extend its contract on a day-by-day basis, with a 10-day notification to cancel, while it continues bargaining.

FIG. 2

FIG. 3

FAST SEMANTIC EXTRACTION USING A NEURAL NETWORK ARCHITECTURE

RELATED APPLICATION INFORMATION

This application claims priority to provisional application Ser. No. 60/893,712 filed on Mar. 8, 2007, incorporated herein by reference.

BACKGROUND

1. Technical Field

The present invention relates to neural networks and more particularly to systems and method for predicting semantic labels, without the use of a parser, by employing neural networks.

2. Description of the Related Art

Semantic understanding plays an important role in many end-user applications involving text: for information extraction, web-crawling systems, question and answer based systems, as well as machine translation, summarization and search. Such applications typically have to be computationally inexpensive to deal with an enormous quantity of data, e.g., web-based systems process large numbers of documents, while interactive human-machine applications require almost instant responses. Another issue is the cost of producing labeled training data needed for statistical models, which is exacerbated when those models also depend on syntactic features which must themselves be learned.

This is an illustration of semantic role labeling for the sentence "The company bought sugar on the world market to meet export commitments." It may be labeled as follows: [The company]$_{ARG0}$ [bought]$_{REL}$ [sugar]$_{ARG1}$ [on the world market]$_{ARGM-LOC}$ [to meet export commitments]$_{ARGM-PNC}$. ARG0 is typically an actor, REL an action, ARG1 an object, and ARGM describes various modifiers such as location (LOC) and purpose (PNC).

To achieve the goal of semantic understanding, the current consensus is to divide and conquer the problem. Researchers tackle several layers of processing tasks ranging from the syntactic, such as part-of-speech labeling and parsing, to the semantic: word-sense disambiguation, semantic role-labeling, named entity extraction, co-reference resolution and entailment. None of these tasks are end goals in themselves but can be seen as layers of feature extraction that can help in a language-based end application, such as those described above.

Unfortunately, the state-of-the-art solutions of many of these tasks are simply too slow to be used in many applications (e.g., as previously described). For example, state-of-the-art syntactic parsers theoretically have cubic complexity in the sentence length and several semantic extraction algorithms use the parse tree as an initial feature.

SUMMARY

A system and method for semantic extraction using neural network architecture includes indexing an input sentence and providing position information for a word of interest and a verb of interest. Words are converted into vectors by assigning them an index from a dictionary. Verb position in the input sentence of the verb of interest and word position with respect to the word to be labeled are integrated by employing a linear layer that is adapted to the input sentence. A linear transformation and squashing function are applied to interpret outputs as class probabilities for semantic role labels. All the weights for the whole architecture are preferably trained by back propagation.

These and other features and advantages will become apparent from the following detailed description of illustrative embodiments thereof r which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A neural network architecture is described for the problem of semantic role labeling. Many current solutions are complicated, consist of several stages and hand-built features, and are too slow to be applied as part of real applications that need semantic labels, partly because of their use of a syntactic parser. In accordance with the present principles, a system and method instead learns a direct mapping from a source sentence to semantic tags for a given predicate without the aid of a parser or a chunker. A resulting system obtains accuracies comparable to the current state-of-the-art at a fraction of the computational cost.

A neural network architecture in accordance with the present principles is able to give a semantic role to a syntactic constituent of a sentence, e.g., annotating the predicate argument structure in text. Because of its nature, role labeling seems to need the syntactic analysis of a sentence before attributing semantic labels. Using this intuition, state-of-the-art systems first build a parse tree, and syntactic constituents are then labeled by feeding hand-built features extracted from the parse tree to a machine learning system. This is rather slow, taking a few seconds per sentence at test time, partly because of the parse tree component, and partly because many of those systems use the Support Vector Machine classifier, which has linear complexity in testing time with respect to the number of training examples. This makes conventional systems difficult to apply to many end user applications.

In accordance with the present principles, a different approach is provided that avoids the more complex task of building a full parse tree. From a machine learning point of view, a human does not need to be taught about parse trees to talk. It is possible, however, that our brains may implicitly learn features highly correlated with those extracted from a parse tree. An architecture is developed that implements this kind of implicit learning, rather than using explicitly engineered features. In practice, the present system also provides semantic tags at a fraction of the computational cost of other methods, taking on average 0.02 seconds to label a sentence from the Penn Treebank, with almost no loss in accuracy.

Shallow Semantic Parsing: FrameNet and the Proposition Bank, or PropBank, are the two main systems currently developed for semantic role-labeling annotation, known to those skilled in the art. PropBank encodes role labels by semantically tagging the syntactic structures of hand annotated parses of sentences. The current version of the dataset gives semantic tags for the same sentences as in the Penn Treebank, which are excerpts from the Wall Street Journal. The central idea is that each verb in a sentence is labeled with its propositional arguments, where the abstract numbered arguments are intended to fill typical roles. For example, ARG0 is typically the actor, and ARG1 is typically the thing acted upon. The precise usage of the numbering system is labeled for each particular verb as so-called frames. Additionally, semantic roles can also be labeled with one of 13 ARGM adjunct labels, such as ARGM-LOC or ARGM-TMP for additional locational or temporal information relative to some verb.

Shallow semantic parsing has immediate applications in tasks such as meta-data extraction (e.g. from web documents) and question and answer based systems (e.g. call center systems), among others.

Several attempts have already been made to build machine learning approaches for the semantic role-labeling problem. A statistical approach to learning (for FrameNet), has had some success. This approach proposed to take advantage of the syntactic tree structure that can be predicted by a parser, such as Charniak's parser, which is known in the art. Their aim was, given a node in the parse tree, to assign a semantic role label to the words that are the children of that node. The approach extracted several key types of features from the parse tree to be used in a statistical model for prediction. These same features also proved crucial to subsequent approaches. These features included: 1) The parts of speech and syntactic labels of words and nodes in the tree. 2) The node's position (left or right) in relation to the verb. 3) The syntactic path to the verb in the parse tree. 4) Whether a node in the parse tree is part of a noun or verb phrase (by looking at the parent nodes of that node). 5) The voice of the sentence: active or passive (part of the PropBank gold annotation); as well as several other features (predicate, head word, verb sub-categorization, . . . ).

Another approach used a similar structure, but added more features, notably head word part-of-speech, the predicted named entity class of the argument, word sense disambiguation of the verb and verb clustering, and others (they add, e.g., 25 variants of 12 new feature types overall). These systems used a parser, as before, and then a polynomial Support Vector Machine (SVM) was used in two further stages: to classify each node in the tree as being a semantic argument or not for a given verb; and then to classify each semantic argument into one of the classes (ARG1, ARG2, etc.). The first SVM solves a two-class problem, the second solves a multi-class problem using a one-versus-the-rest approach. The final system, called ASSERT (see Pradhan et al. in "Shallow semantic parsing using support vector machines", Proceedings of HLT/NAACL-2004), gives state-of-the-art performance.

We compare the present results to this system in our experimental results section below. We focus herein on a comparison with ASSERT because software to re-run it is available online. This also gives us a timing result for comparison purposes.

The three-step procedure used in ASSERT (calculating a parse tree and then applying SVMs twice) leads to good classification performance, but has several drawbacks. First in speed: predicting a parse tree is extremely demanding in computing resources. Secondly, choosing the features necessary for SVM classification requires extensive research. Finally, the SVM classification algorithm used in existing approaches is rather slow: SVM training is at least quadratic in time with respect to the number of training examples. The number of support vectors involved in the SVM decision function also increases linearly with the number of training examples. This makes SVMs slow on large-scale problems, both during training and testing phases.

To alleviate the burden of parse tree computation, several attempts have been made to remove the full parse tree information from the semantic role labeling system, in fact the shared task of CONLL 2004 was devoted to this goal, but the results were not completely satisfactory.

Previously, it has been attempted to be shown that the parse tree is necessary for good generalization by showing that segments derived from a shallow syntactic parser or chunker do not perform as well for this goal. A further analysis of using chunkers, with improved results was also shown, but still concluded the full parse tree is most useful.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
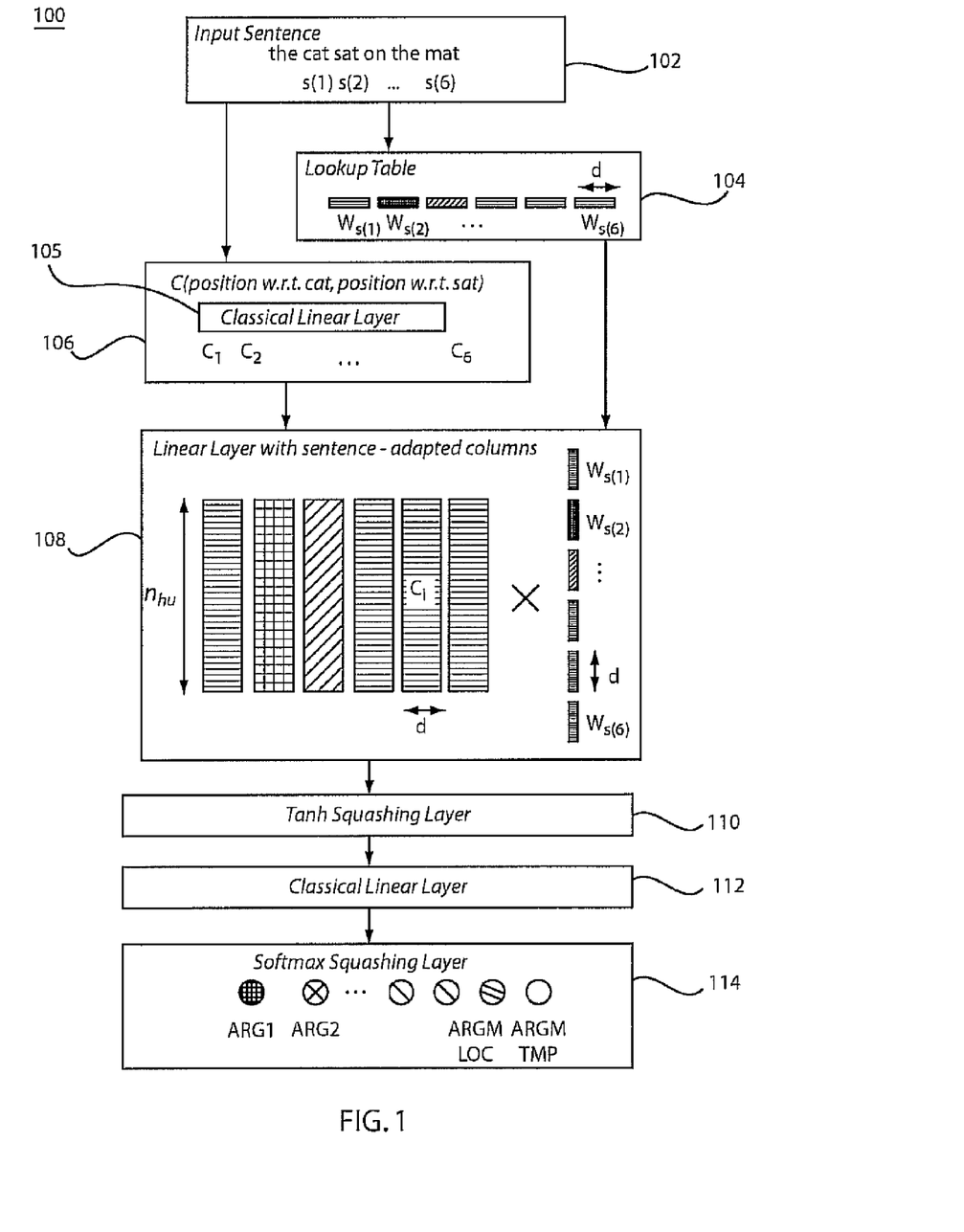
FIG. 1 is a block/flow diagram showing a neural network architecture and method for shallow semantic parsing in accordance with one illustrative embodiment.

Referring now to the drawings in which like numerals represent the same or similar elements and initially to FIG. 1, a neural network architecture 100 is illustratively shown in accordance with an exemplary embodiment. In one embodiment, architecture 100 provides an end-to-end fast learning system to output semantic roles for syntactic constituents without using a time consuming parse tree. The architecture 100 explores whether machine learning approaches can learn structure implicitly. Hence, even if there is a deep relationship between syntax and semantics, we prefer to avoid hand-engineered features that exploit this, and develop a model that can learn these features instead. In accordance with the present principles, we are thus not interested in chunker-based techniques, even though they are faster than parser-based techniques. The neural network based architecture 100 achieves these two goals.

Architecture 100 preferably includes a Multi Layer Perceptron (MLP). MLPS have been used for many years in the machine learning field and slowly abandoned for several reasons: partly because of the difficulty of solving the non-convex optimization problems associated with learning, and partly because of the difficulty of their theoretical analysis compared to alternative convex approaches.

An MLP works by successively projecting the data to be classified into different spaces, e.g., an input sentence 102. These projections are done in what is called hidden layers. Given an input vector z in block 102, a hidden layer 108 applies a linear transformation (matrix M) followed by a squashing function h in block: $z \rightarrow Mz \rightarrow h(Mz)$ (1).

A typical squashing function may include the hyperbolic tangent h(•) or tanh(•). A layer 112 (the output layer) linearly separates the classes. The composition of the projections in the hidden layers could be viewed as the work done by a kernel in SVMs. However, there is a very important difference: the kernel in SVM is fixed and arbitrarily chosen, while the hidden layers in an MLP are trained and adapted to the classification task. This permits the creation of a more flexible classification architecture.

The architecture 100 includes an input sequence in block 102. Output class probabilities for a word on interest (e.g., "cat") given a verb of interest ("sat") are given in block 114.

The present architecture 100 for semantic role labeling classifies each word of a sentence separately. We do not use any semantic constituent information: if the model is powerful enough, words in the same semantic constituent should have the same class label. This means we also do not separate the problem into an identification and classification phase, but rather solve the problem in a single step.

Notation: We represent words as indices. We consider a finite dictionary of words $D \subset N$. Let us represent a sentence of $n_w$ words to be analyzed in block 102 as a function s(•). The $i^{th}$ word in the sentence is given by the index s(i): $1 \leq i \leq n_w$ s(i) $\in$ D.

We are interested in predicting the semantic role label of the word at position $pos_w$, given a verb at position $pos_v$ ($1 \leq pos_w, pos_v \leq n_w$). A mathematical description of the network architecture is schematically depicted in FIG. 1.

Transforming words into feature vectors: Our first concern in semantic role labeling is that we have to deal with words, and that a simple index $i \in D$ does not carry any information specific to a word. For each word, we need a set of features relevant for the task. As described above, previous methods construct a parse tree, and then compute hand-built features which are then fed to a classification algorithm. To bypass the use of a parse tree, in block 104, we convert each word $i \in D$ into a particular vector $w_i \in R^d$ which is going to be learned for the task we are interested. R is the set of real numbers and $R^d$ is the set of d-dimensional vectors.

A lookup table in block 104 replaces the word indices into a concatenation of vectors:

$$\{s(1), \ldots, s(n_w)\} \rightarrow (w_s(1) \ldots w_s(n_w)) \in R^{nwd}. \quad (2)$$

The weights $\{w_i | i \in D\}$ for this layer are considered during a back propagation phase (which is a standard method for training a neural network) of the MLP, and thus are adapted automatically for the task of interest.

In block 106, the verb position is integrated. Feeding word vectors alone to a linear classification layer 105 may lead to poor accuracy because the semantic classification of a given word also depends on the verb in question. Therefore, in addition, we need to provide the MLP with information about the verb position within the sentence. For that purpose, we use an adapted linear layer in block 108 which is adapted to the sentence considered. The adapted linear layer takes the form:

$$(w_{s(1)} \ldots, w_{s(n_w)}) \mapsto M \begin{pmatrix} w_{s(1)}^T \\ \vdots \\ w_{s(n_w)}^T \end{pmatrix},$$

where $M \in R^{nhu \times nwd}$, and $n_{hu}$ is the number of hidden units and d is a vector dimension. The specific nature of this layer 108 is that the matrix M has a special block-column form which depends on the sentence: $M = (C_1 | \ldots | C_{nw})$, where each column $C_i \in R^{nhu \times d}$ depends on the position of the $i^{th}$ word in s(•), with respect to (w.r.t) the position $pos_w$ of the word of interest, and with respect to the position $pos_v$ of the verb of interest: $C_i = C(i - pos_w, i - pos_v)$, where C(•,•) is a function to be chosen (block 106).

In our experiments, C(•,•) was a linear layer with discretized inputs (i−$pos_w$, i−$pos_v$) which were transformed into two binary vectors of window size z, where a bit is set to 1 if it corresponds to the position to encode, and 0 otherwise. These two binary vectors are then concatenated and fed to the linear layer 108. We chose the "window size" wsz=11. If a position lies outside the window, then we still set the leftmost or rightmost bit to 1. The parameters involved in this function are also considered during the back propagation. With such an architecture, we permit our MLP to automatically adapt the importance of a word in the sentence given its distance to the word we want to classify, and to the verb we are interested in. This concept is one important aspect in accordance with the present principles for the success of the entire architecture 100.

Learning class probabilities: the squashing layer 110, the classical linear layer 112 as described in (1), with a softmax squashing function in block 114 are performed. The Softmax squashing is described in J. S. Bridle, "Probabilistic interpretation of feed-forward classification network outputs, with relationships to statistical pattern recognition", F. Fogelman Soulid and J. Herault, editors, *Neurocomputing: Algorithms, Architectures and Applications*, pages 227-236, NATO ASI Series.

Considering equation (1) and given $\tilde{z} = Mz$, we have:

$$h_i(\tilde{z}) = \frac{\exp \tilde{z}_i}{\sum_j \exp \tilde{z}_j}.$$

This permits us to interpret outputs as probabilities for each semantic role label. The training of the whole system is preferably achieved using a normal stochastic gradient descent.

Word representation: in the present model, we are "learning" one d dimensional vector to represent each word. If the dataset were large enough, this would be an elegant solution. In practice, many words occur infrequently within PropBank, for example, so (independent of the size of d) we can still only learn a very poor representation for words that only appear a few times. Hence, to control the capacity of the model, we take the original word and replace it with its part-of-speech if it is a verb, noun, adjective, adverb or number as determined by a part-of-speech classifier, and keep the words for all other parts of speech. This classifier is itself a neural network. In this way, we keep linking words which are important for this task. We do not do this replacement for the predicate itself.

Experiments: We used Sections 02-21 of the PropBank dataset version 1 for training and validation and Section 23 for testing as standard in all our experiments. We first describe the part-of-speech tagger we employ, and then describe our semantic role labeling experiments. Software for the present method may be referred to as SENNA (Semantic Extraction using a Neural Network Architecture), and test set predictions of our system in comparison to ASSERT will be made.

Part-Of-Speech Tagger: a part-of-speech classifier that we have employed has a neural network architecture of the same type as architecture 100, where the function $C_i=C(i-pos_w)$ depends now only on the word position, and not on a verb. More precisely:

$$C_i = \begin{cases} 0 & \text{if } 2|i - pos_w| > wsz - 1 \\ W_{i-pos_w} & \text{otherwise,} \end{cases}$$

where $W_k \in R^{nhu \times d}$ and wsz is a window size. We chose wsz=5 in our experiments. The d-dimensional vectors learned take into account the capitalization of a word, and the prefix and suffix calculated using Porter-Stemmer, which is known in the art. We trained on the training set of Prop-Bank supplemented with the Brown corpus (known in the art), resulting in a test accuracy on the test set of PropBank of 96.85% which compares to 96.66% using the Brill tagger (see E. Brill, "A simple rule-based part of speech tagger", *Proceedings of the Third Conference on Applied Natural Language Processing*, pages 152-155, 1992).

Semantic Role Labeling: In our experiments, we considered a 23-class problem of NULL (no label), the core arguments ARGO-5, REL, ARGA, and ARCM-along with the 13 secondary modifier labels such as ARGM-LOC and ARGM-TMP. We simplified R-ARGn and C-ARGn to be written as ARGn, and post-processed ASSERT to do this as well.

We compared our system to the freely available ASSERT system. Both systems are fed only the input sentence during testing, with traces removed, so they cannot make use of many PropBank features such as frameset identitifier, person, tense, aspect, voice, and form of the verb. As our system/method outputs a semantic tag for each word of a sentence, we directly compare this per-word accuracy with ASSERT. Because ASSERT uses a parser, and because PropBank was built by labeling the nodes of a hand-annotated parse tree, per-node accuracy is available. Unfortunately our approach is based on a completely different premise: we tag words, not syntactic constituents coming from the parser.

The per-word accuracy comparison results can be seen in Table 1. Before labeling the semantic roles of each predicate, one first identifies the predicates themselves. If a predicate is not identified, NULL tags are assigned to each word for that predicate. The first line of results in table 1 takes into account this identification process. For the neural network, we used our part-of-speech tagger to perform this as a verb-detection task. We noticed ASSERT failed to relatively identify many predicates. In particular, it seems predicates such as "is" are sometimes labeled as AUX by the part-of-speech tagger, and subsequently ignored.

To deal with this, we considered the additional accuracy (second row in table 1) measured over only those sentences where the predicate was identified by ASSERT.

Timing results: The per-sentence compute time is also given in Table 1, averaged over all sentences in the test set. The present method is around 250 times faster than ASSERT. It is not really feasible to run ASSERT for most applications.

TABLE 1

Experimental comparison with ASSERT

| Measurement | Present system | ASSERT |
| --- | --- | --- |
| Per-word accuracy (all verbs) | 83.64% | 83.46% |
| Per-word accuracy (ASSERT | 84.09% | 86.06% |
| Per-sentence | 0.02 secs | 5.08 secs |

Analysis of the present MLP embodiment: While we gave an intuitive justification of the architecture 100, we now give a systematic empirical study. First, providing the position of the word and the predicate in function $C(\bullet,\bullet)$ is one important aspect essential: the best model we obtained with a window around the word only gave 51.3%, assuming correct identification of all predicates. A best model in accordance with the present principles achieves 83.95% in this setting.

If we do not cluster the words according to their part-of-speech, we also lose some performance, obtaining 78.6%. On the other hand, clustering all words (such as CC, DT, IN part-of-speech tags) also gives weaker results (81.1% accuracy). We believe that including all words would give very good performance if the dataset was large enough, but training only on PropBank leads to overfitting, many words being infrequent. Clustering is a way to fight against overfitting, by grouping infrequent words: for example, words with the label NNP, JJ, RB (which we cluster) appear on average 23, 22 and 72 times respectively in the training set, while CC, DT, IN (which we do not cluster) appear 2420, 5659 and 1712 times, respectively.

Even though some verbs are infrequent, one cannot cluster all verbs into a single group, as each verb dictates the types of semantic roles in the sentence, depending on its frame. Clustering all words into their part-of-speech, including the predicate, gives a poor 73.8% compared with 81.1%, where everything is clustered apart from the predicate.

Figure 2:
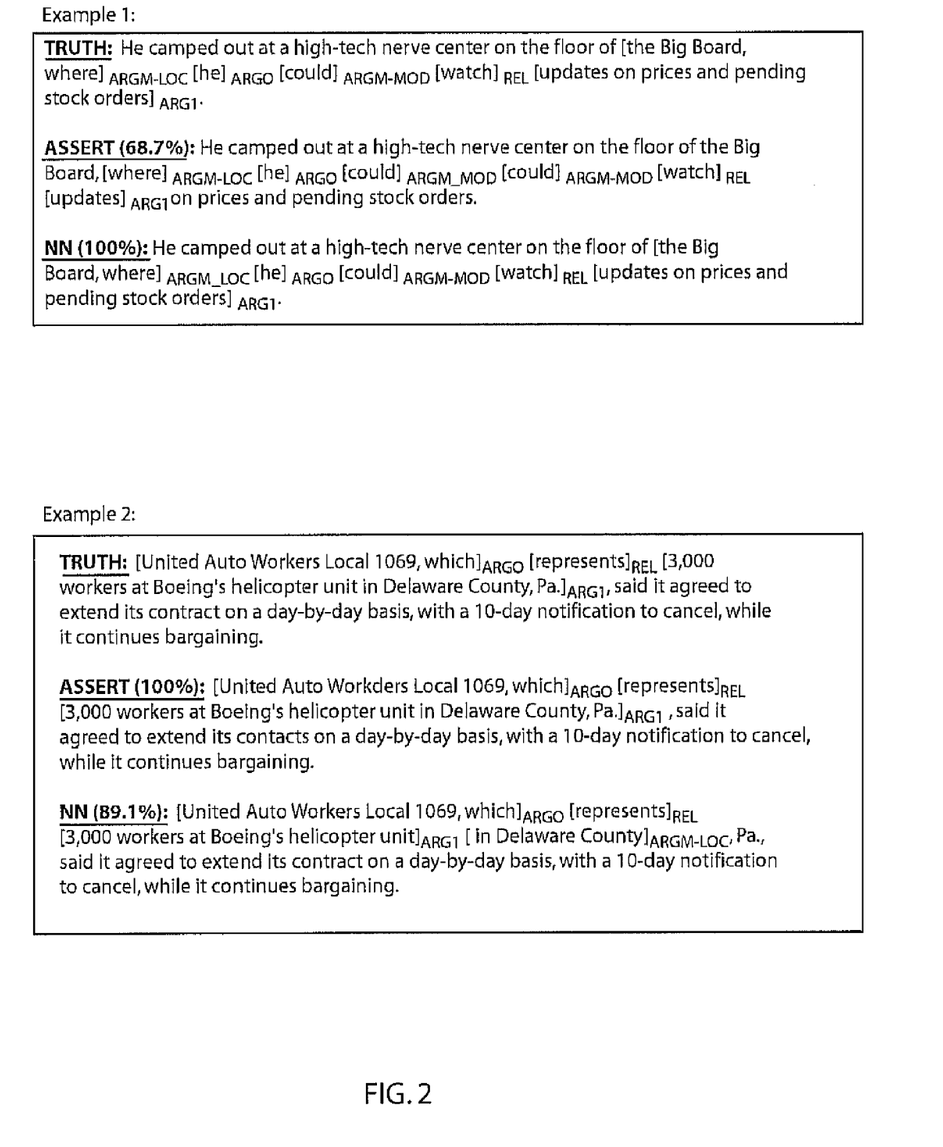
FIG. 2 is an illustrative semantic labeled output showing two example sentences for comparison after being analyzed by ASSERT, the present neural networks (NN) and a true result (TRUTH)

FIG. 2 gives some anecdotal examples of test set predictions of our final model compared to ASSERT. Referring to FIG. 2, two examples from the PropBank test set, showing Neural Net (NN) in accordance with the present principles and ASSERT and gold standard labelings, with per-word accuracy in brackets. Note that even though NN labeling does not match the hand-annotated one in the second sentence, it still seems to make some sense as "in Delaware County" is labeled as a location modifier.

Argument Classification Accuracy: Currently, the present architecture is designed to label on a per-word basis, while existing systems perform a segmentation process, and then label segments. While we do not optimize our model for the same criteria, it is still possible to measure the accuracy using the same metrics. We measured the argument classification accuracy of our network, assuming the correct segmentation is given to our system, as in prior art systems (e.g., Pradhan et al., 2004, cited above), by post-processing our per-word tags to form a majority vote over each segment. This gives 83.18% accuracy for our network when we suppose the predicate must also be identified, and 80.53% for the ASSERT software. Measuring only on predicates identified by ASSERT we instead obtain 84.32% accuracy for our network, and 87.02% for ASSERT.

We have introduced a neural network architecture that can provide computationally efficient semantic role tagging. It is also a general architecture that could be applied to other problems as well. Because the present network currently outputs labels on a per-word basis, it is difficult to assess existing accuracy measures. However, it should be possible to combine our approach with a shallow parser to enhance performance, and make comparisons more direct.

The present principles may be applied in a plurality of different applications, including, but not limited to the following areas: 1) Incorporating hand-built features: Currently, the prior knowledge the present system encodes comes from part-of-speech tags, in stark contrast to other methods. Of course, performance would improve with more hand-built features. For example, simply adding whether each word is part of a noun or verb phrase using the hand-annotated parse tree may improve the performance of the present system from 83.95% to 85.8%. One must trade the generality of the model with its specificity, and also take into account how long the features take to compute.

2) Incorporating segment information: the present system has no prior knowledge about segmentation in text. This could be encoded in many ways: most obviously by using a chunker, but also by designing a different network architecture, e.g., by encoding continuity constraints. To show the latter is useful, using hand-annotated segments to force contiguity by majority vote leads to an improvement from 83.95% to 85.6%.

3) Incorporating known invariances via virtual training data: In image recognition problems, it is common to create artificial training data by taking into account invariances in the images, e.g., via rotation and scale. Such data improves generalization substantially. It may be possible to achieve similar results for text, by "warping" training data to create new sentences, or by constructing sentences from scratch using a hand-built grammar.

4) Unlabeled data: Our representation of words is as d dimensional vectors. To attempt to improve this representation, a language model may be learned from unlabeled data. As many words in Prop-Bank only appear a few times, the representation might improve, even though the learning is unsupervised. This may also make the system generalize better to types of data other than the Wall Street Journal.

5) Transductive Inference: Finally, one can also use unlabeled data as part of the supervised training process, which is called transduction or semi-supervised learning.

In particular, we find the possibility of using unlabeled data, invariances and the use of transduction exciting. These possibilities naturally fit into our framework, whereas scalability issues will limit their application in competing methods.

Time Delay Neural Networks: Time Delay Neural Networks (TDNN) are a particular kind of MLP able to work on sequences. Consider a sequence of n. identically sized vectors;

$$(x_1, x_2, \ldots, x_n), \forall i \, x_i \in R^d. \tag{3}$$

The output vector o(t) of a classical TDNN layer at time t can then be computed as:

$$o(t) = \sum_{j=1-i}^{n-i} L_j \cdot x_{i+j} \tag{4}$$

where $L_j \in R_{n_{int}} \times R^d (1 \leq j \leq n)$ are the weights of the layer (with $n_{int}$ hidden units).

Note that the parameters $L_j$ are shared through time t: TDNNs obviously operate a convolution on the input sequence. One usually constrains this convolution by defining a kernel width k which enforces $$\forall |j| > \frac{k-1}{2}, L_j = 0 \tag{5}$$

The approach previously described with reference to FIG. 1 may be viewed as a generalization of TDNNs: the output of the layer integrating the verb position for an input sequence in Eq. (3) can be computed as:

$$o(t) = C(t - pos_w, t - pos_v) \cdot x_1$$

The parameters C are shared through time: one could say we have a TDNN with a kernel width k=1 but where the parameters are conditioned with other variables (distances with respect to the verb and word of interest).

TDNNs for semantic role labeling: Above, we showed that designing neural networks for semantic role labeling involves finding ways to encode words in the sentence, and ways to integrate the position of the predicate that is being considered for role labeling. A way to integrate the verb position by constructing a special layer in the MLP was proved with respect to FIG. 1. Here, we instead propose to use a TDNN with carefully designed inputs.

Figure 3:
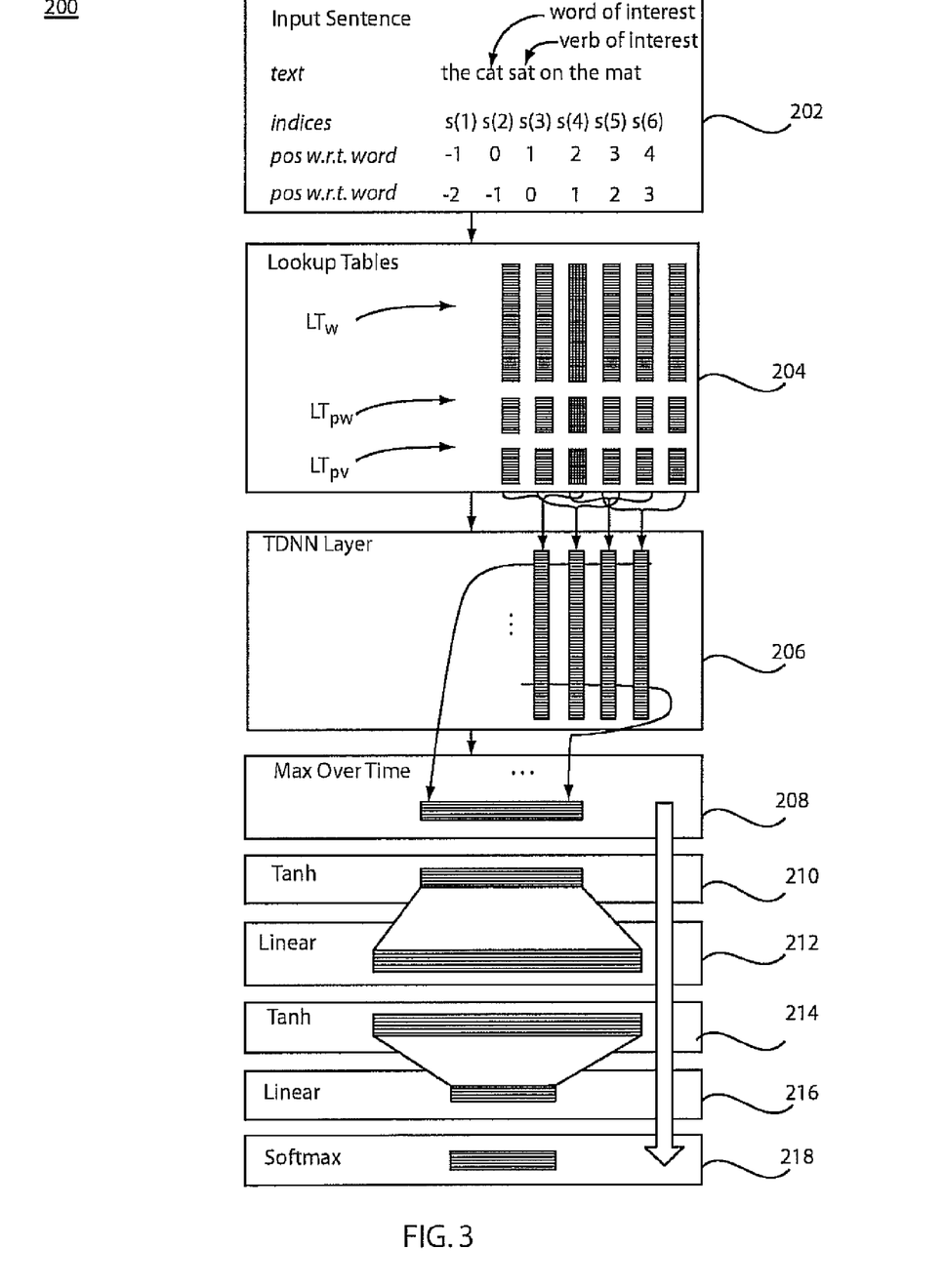
FIG. 3 is a block/flow diagram showing another neural network architecture and method for shallow semantic parsing which employs a time delay neural network architecture in accordance with another illustrative embodiment.

Referring to FIG. 3, another MLP architecture 200 for shallow semantic parsing is shown using a TDNN in accordance with the present principles. In block 202, an input sentence $\{s(1), \ldots, s(n_w)\}$ and the index $pos_w$ of the word to be classified in this sentence with respect to the verb at index $pos_v$ are given. For example, in the sentence: "the cat sat on the mat", the word of interest is "cat", $pos_w$ is −1 for "the", 0 for "cat", 1 for "sat" and so on; and $pos_v$ is −2 for "the", −1 for "cat", 0 for "sat", 1 for "on" and so on.

For this input sequence, the output class probabilities for the word of interest ("cat") given the verb of interest ("sat") are given as the output. To integrate the verb and word positions, we first consider for each word in the sentence a triplet containing the word itself, its signed position with respect to the word to be classified, and its signed position with respect to the verb considered:

$$\{s(1), \ldots, s(n_w)\} \mapsto \{ \ldots, (s(i), i - pos_w, i - pos_v), \ldots \}.$$

In a first layer of the neural network in block 204, all triplets in the sentence are transformed into a vector by concatenating an output of three lookup tables $LT_w$, $LT_{pw}$, and $LT_{pv}$, similar to the lookup table presented above in block 104 (FIG. 1). The concatenation includes:

$$(s(i), i - pos_w, i - pos_v) \mapsto (LT_w[s(i)], LT_{pv}[i - pos_w], LT_{pv}[i - pos_v]).$$

The induced sequence is then given to a classical TDNN layer in block 206. In block 208, a time dimension is removed by operating a max over time operation, as in known in the art.

Subsequent squashing (210, 214) and linear layers (212 and 216) are provided as classical neural network layers. A softmax layer 218 is also provided as before.

Experiments: We used in our experiment the word representation suggested above with respect to FIG. 1. The output vector sizes of the lookup tables $LT_w$, $LT_{pw}$ and $LT_{pv}$ were respectively 20, 5 and 5 for our best tuned neural network. The TDNN layer had 120 hidden units and a kernel width k=3. Our best network also had an additional classical hidden layer of 200 hidden units. The data setup was the same as the one presented for FIG. 1.

The per-word-accuracy on the test set was 85.45% which is significantly better than the original embodiment (83.64%) and the reference ASSERT (83.46%). The network was even slightly faster than the previous one, needing on average less than 0.02 seconds to process a sentence (more than 260 times faster than ASSERT).

Based on a TDNN and carefully designed inputs, this new neural network is simpler and gives better generalization performance than the previous method, yet it is also just as fast to compute. It also outperforms one of the best existing approach based on parse trees (ASSERT), both in time and generalization.

Having described preferred embodiments of a system and method for fast semantic extraction using a neural network architecture (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for semantic extraction using neural network architecture, comprising:
   indexing an input sentence and providing position information for a word of interest and a verb of interest;
   converting words into vectors using features learned during training;
   integrating verb of interest and word of interest position relative to the word to be labeled by employing a linear layer that is adapted to the input sentence; and
   applying linear transformations and squashing functions to the vectors to predict semantic role labels.

2. The method as recited in claim 1, wherein converting words into vectors includes employing at least one lookup table to output a concatenation of vectors including adapted weights.

3. The method as recited in claim 1, wherein integrating verb of interest position includes employing a matrix with a block-column form that depends on the input sentence.

4. The method as recited in claim 1, wherein each column of the matrix depends on a position of an $i^{th}$ word in the input sentence with respect to a position of the word of interest and with respect to a position of the verb of interest.

5. The method as recited in claim 1, wherein the neural network architecture includes a multi-layer perceptron.

6. The method as recited in claim 1, wherein squashing function includes a softmax squashing layer that outputs probabilities for argument classes.

7. The method as recited in claim 1, wherein converting words into vectors includes outputting vectors of a same dimension d for each word.

8. The method as recited in claim 1, wherein converting words into vectors includes outputting vectors of different dimensions for each word, each word of interest position and each verb position.

9. A computer readable non-transitory storage medium comprising a computer readable program, wherein the computer readable program when executed on a computer causes the computer to perform the steps of claim 1.

10. A method for semantic extraction using neural network architecture, comprising:
    indexing an input sentence and providing position information for a word of interest and a verb of interest;
    converting words into vectors by concatenating vectors using a plurality of lookup tables referencing features obtained during indexing;
    integrating verb position in the input sentence of the verb of interest by employing a time delay neural network linear layer that is adapted to the input sentence;
    removing a time dimension by employing a max over time layer; and
    applying a squashing function to interpret outputs of the linear layer as class probabilities for semantic role labels.

11. The method as recited in claim 10, wherein integrating verb position includes employing a matrix with a block-column form that depends on the input sentence.

12. The method as recited in claim 10, wherein the neural network architecture includes a multi-layer perceptron.

13. The method as recited in claim 10, wherein the squashing function includes a softmax squashing layer that outputs probabilities for argument classes.

14. The method as recited in claim 10, wherein converting words into vectors includes outputting vectors of different dimensions for each word, each word of interest position and each verb position.

15. A computer readable non-transitory storage medium comprising a computer readable program, wherein the computer readable program when executed on a computer causes the computer to perform the steps of claim 10.

16. A neural network implemented in a computer readable non-transitory storage medium comprising a computer readable program, wherein the computer readable program when executed on a computer performs semantic extraction and semantic role labeling, comprising:
    an indexer configured to index an input sentence and provide position information for a word of interest and a verb of interest;
    at least one lookup table for converting words into vectors using features obtained from the indexer for the input sentence;
    a first linear layer configured to integrate verb position in the input sentence of the verb of interest into a block-column structure that is adapted to the input sentence; and
    a second linear layer configured to perform a linear transformation using the block-column structure and the word vectors; and
    a squashing layer configured to interpret outputs of the linear layer as class probabilities for semantic role labels for the input sentence.

17. The neural network as recited in claim 16, wherein the at least one lookup table outputs a concatenation of vectors including adapted weights.

18. The neural network as recited in claim 16, wherein each column of the block-column structure depends on a position of an $i^{th}$ word in the input sentence with respect to a position of the word of interest and with respect to a position of the verb of interest.

19. The neural network as recited in claim 16, wherein the neural network architecture includes a multi-layer perceptron.

20. The neural network as recited in claim 16, wherein the squashing layer includes a softmax squashing layer that outputs probabilities for argument classes.

21. The neural network as recited in claim 16, wherein the second linear layer includes a time delay neural network.

* * * * *